United States Patent
Samuel et al.

(10) Patent No.: US 10,474,824 B2
(45) Date of Patent: Nov. 12, 2019

(54) PREVENTION OF EXECUTION OF UNAUTHORIZED FIRMWARE FROM UEFI FIRMWARE VOLUMES

(71) Applicant: Dell Products L.P., Round Rock, TX (US)

(72) Inventors: Balasingh Samuel, Round Rock, TX (US); Walter Phillips, Georgetown, TX (US); Richard Tonry, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 183 days.

(21) Appl. No.: 15/198,829

(22) Filed: Jun. 30, 2016

(65) Prior Publication Data

US 2018/0004952 A1    Jan. 4, 2018

(51) Int. Cl.
*G06F 21/57*  (2013.01)

(52) U.S. Cl.
CPC ................... *G06F 21/575* (2013.01)

(58) Field of Classification Search
CPC .......... G06F 21/57; G06F 9/44; G06F 15/177; G06F 21/572; G06F 21/575
See application file for complete search history.

(56) References Cited

U.S. PATENT DOCUMENTS

| 9,277,049 | B1* | 3/2016 | Danis | H04M 3/42042 |
| 2007/0079094 | A1* | 4/2007 | Wang | G06F 9/4401 |
| | | | | 711/163 |
| 2013/0091571 | A1* | 4/2013 | Lu | G06F 21/563 |
| | | | | 726/23 |
| 2015/0089209 | A1* | 3/2015 | Jacobs | G06F 21/572 |
| | | | | 713/1 |
| 2016/0378990 | A1* | 12/2016 | Goodman | G06F 21/572 |
| | | | | 726/19 |

\* cited by examiner

*Primary Examiner* — Fahmida Rahman
(74) *Attorney, Agent, or Firm* — Baker Botts L.L.P.

(57) ABSTRACT

Unauthorized code may be stored as data in a data volume of a firmware volume. To prevent or block execution of the unauthorized code, the firmware file system (FFS) file that includes the unauthorized code may be tagged, marked or deleted according to a system bios policy. These corrupted FFS files are thus blocked from execution during initialization or a boot process of a basic input/output system (BIOS) firmware as they are not published or enumerated to an execution list of the BIOS firmware.

20 Claims, 4 Drawing Sheets

PREVENTION OF EXECUTION OF UNAUTHORIZED FIRMWARE FROM UEFI FIRMWARE VOLUMES

BACKGROUND

Field of the Disclosure

This disclosure relates generally to information handling systems and more particularly to preventing execution of unauthorized firmware, for example, during basic input/output system (BIOS) initialization or a boot process.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In certain information handling systems, a basic input/output system (BIOS) may include BIOS firmware. Some BIOS firmware designers or providers may designate certain portions of the BIOS firmware for code and other portions for data. Generally, during initialization or a boot process executable code is executed or ran from one or more files in a volume associated with code (or a code volume) of a firmware volume. However, during operation of the information handling system, firmware file system (FFS) files of a volume associated with data (or a data volume) of the firmware volume may be altered or changed to include an entry point or code (for example, executable instructions) for execution. On the next boot, these FFS files associated with a data volume may be executed. These FFS files volume may contain malicious or unauthorized content. It may be desirable to prevent the execution of such FFS files to protect the integrity and operation of the information handling system.

SUMMARY

In one or more embodiments a method for firmware volume mapping by a basic input/output system (BIOS), for example, a unified extensible firmware interface (UEFI) BIOS, of an information handling system comprises receiving information associated with a firmware volume, where such may include enumerating each firmware volume in a firmware of the information handling system. It may be determined based, at least in part, on that received information whether the firmware volume is a data volume. If the firmware volume is a data volume, then one or more files associated with the data volume are identified. If it is determined that the one or more identified files comprise an associated entry point, then the identified one or more files determined to comprise an associated entry point are tagged as blocked for execution so that during initialization or a boot process those files are not executed. In one or more embodiments the one or more tagged files may be deleted or added to a list of blacklist or both. In one or more embodiments, adding to the list of blacklist files may comprise adding a global unique identifier associated with the at least one of the tagged files. In one or more embodiments, a log may be created and log event information associated with each of the tagged files may be added to the log.

In one or more embodiments, an information handling system may comprise a memory and a processor coupled to the memory, where the processor has access to the BIOS, and where the BIOS includes one or more instructions stored in the memory and executable by the processor to perform any one or more of steps of one or more embodiments. In one or more embodiments, a non-transitory computer-readable medium stores one or more instructions, the one or more instructions representing a BIOS, that, when executed by a processor of an information handling system, cause the processor to perform any one or more steps of one or more embodiments.

Other disclosed aspects include article of manufacture comprising a non-transitory computer-readable medium storing instructions executable by a processor, and the information handling system comprising a processor subsystem having access to the BIOS.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer (for example a desktop or a laptop), a tablet computer, a mobile device (for example, a personal digital assistant (PDA or smart phone), server (for example, a blade server or a rack server), a consumer electronic device, a network storage device, or another suitable device and may vary in size, shape, performance, functionality, and price. The information handling system may include memory (for example, volatile and nonvolatile memory), one or more processing resources such as a central processing unit (CPU) or hardware or software control logic. Additional components of the information handling system may include one or more disk drives, one or more storage devices, one or more communications ports (for example, network ports) for communicating with external devices as well as various input and output (I/O) devices, such as a keyboard, a mouse, a touchscreen and a video display. The information handling system may also include one or more buses operable to transmit communication between the various hardware components.

Additionally, the information handling system may include firmware for controlling or communicating with or both, for example, hard drives, network circuitry, memory devices, I/O devices, and other peripheral devices. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, a computer-readable non-transitory storage medium or media may include one or more semiconductor-based or other integrated circuits (ICs) (such as, for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate. A computer-readable non-transitory storage medium may include an instrumentality or aggregation of instrumentalities that may retain data or one or more instructions or both for a period of time. A computer-readable non-transitory storage medium include, without limitation, storage media such as a direct access storage device (for example, a hard disk drive or floppy disk), a sequential access storage device (for example, a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

As noted previously, certain information handling systems may include BIOS firmware that may control certain hardware elements and may provide for user management of the hardware elements. As will be described in further detail herein, a BIOS non-volatile memory may store BIOS firmware and one or more system boot policies included in the information handling system. The components may be hardware components or software components or both.

Particular embodiments are best understood by reference to FIGS. 1, 2, 3 and 4 wherein like numbers are used to indicate like and corresponding parts.

Figure 1:
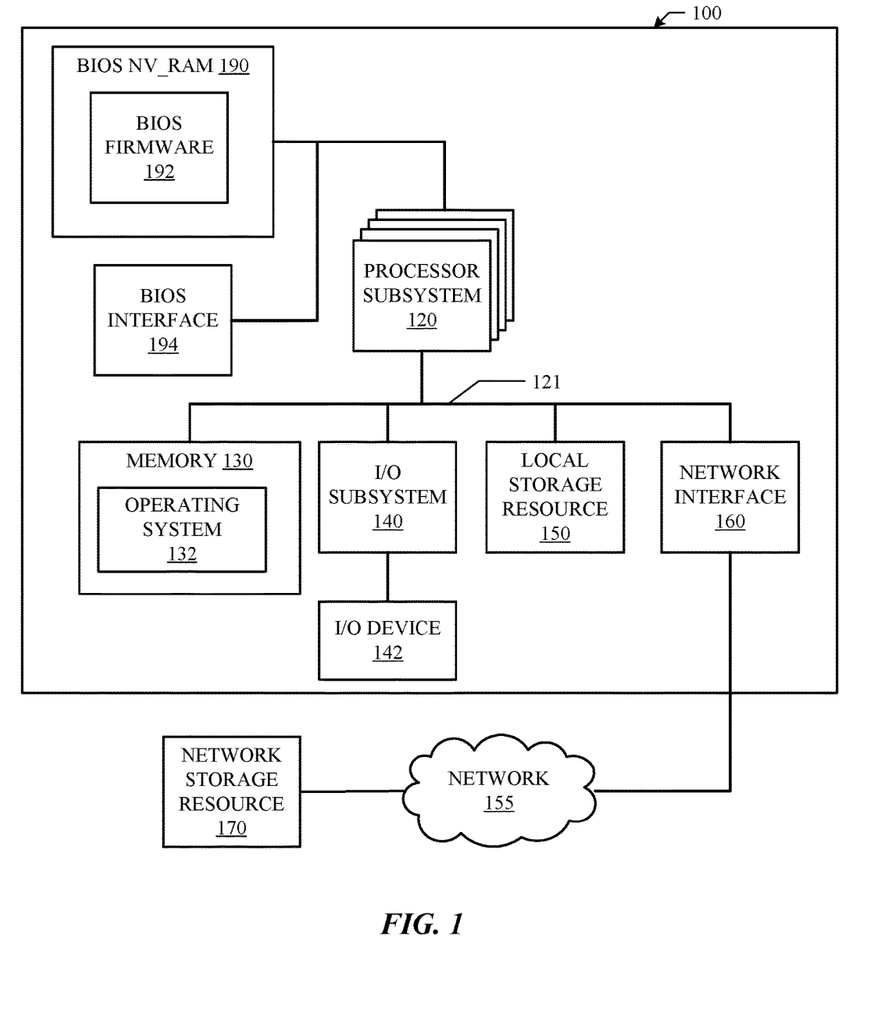
FIG. 1 is a block diagram of selected elements of an embodiment of an information handling system for preventing execution of unauthorized files during initialization or a boot process according to one or more aspects of the present disclosure.

Turning now to the drawings, FIG. 1 illustrates a block diagram depicting selected elements of an embodiment of information handling system 100 according to one or more aspects of the present disclosure, for example, preventing execution of unauthorized files during initialization or a boot process of the information handling system 100. Also shown with information handling system 100 are external or remote elements, namely, network 155 and network storage resource 170.

As shown in FIG. 1, components of information handling system 100 may include, but are not limited to, processor subsystem 120, which may comprise one or more processors, and system bus 121 that communicatively couples various system components to processor subsystem 120 including, for example, memory 130, I/O subsystem 140, local storage resource 150, and network interface 160. System bus 121 may represent a variety of suitable types of bus structures, for example, a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, Video Electronics Standards Association (VESA) local bus, any other suitable bus, or any combination thereof.

In FIG. 1, network interface 160 may be a suitable system, apparatus, or device operable to serve as an interface between information handling system 100 and a network 155. Network interface 160 may enable information handling system 100 to communicate over network 155 using a suitable transmission protocol and/or standard, including, but not limited to, transmission protocols and/or standards enumerated below with respect to the discussion of network 155. In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof. In certain embodiments, information handling system 100 and network 155 may be included in a rack domain.

As depicted in FIG. 1, processor subsystem 120 may comprise a system, device, or apparatus operable to interpret or execute program instructions, process data, or any combination thereof and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret or execute program instructions, process data stored locally (for example, in memory 130 and/or another component of physical hardware 102), or any combination thereof. In the same or alternative embodiments, processor subsystem 120 may interpret or execute program instructions, process data stored remotely (for example, in a network storage resource) or any combination thereof.

Also in FIG. 1, memory 130 may comprise a system, device, or apparatus operable to retain or retrieve program instructions or data or both for a period of time (for example, computer-readable media). In one or more embodiments, memory 130 may internal to or external to information handling system 100. As shown in the example embodiment of FIG. 1, memory 130 stores operating system 132, which may represent instructions executable by processor subsystem 120 to operate information handling system 100 after booting of the BIOS firmware 192. It is noted that in different embodiments, operating system 132 may be stored at network storage resource 170 and may be accessed by processor subsystem 120 via network 155 Memory 130 may comprise random access memory (RAM), electrically erasable programmable read-only memory (EEPROM), a PCM-CIA card, solid-state memory, flash memory, magnetic storage, opto-magnetic storage, and/or a suitable selection and/or array of volatile or non-volatile memory that retains data after power to its associated information handling system, such as information handling system 100, is powered down. In one or more embodiments, memory 130 or network storage resource 170 or both may include one or more storage control units (not shown) for facilitating communication between processor subsystem 120 and any one or more the memory 130 and network storage resource 170.

Local storage resource 150 may comprise a computer-readable non-transitory storage medium (for example, hard disk drive, floppy disk drive, CD-ROM, other type of rotating storage media, flash memory, EEPROM, another type of solid state storage media, or any combination thereof) and may be generally operable to store instructions or data or both. For example, local storage resource 150 may store executable code in the form of program files that may be loaded into memory 130, or any other suitable memory, for execution.

In information handling system 100, I/O subsystem 140 may comprise hardware, software, a system, device, or apparatus generally operable to receive or transmit data to, from, or within (or any combination thereof) information handling system 100 and one or more I/O devices 142. Information handling system 100 may comprise one or more I/O devices 142, where appropriate. In one or more embodiments, one or more I/O devices may be remote from the information handling system 100. I/O subsystem 140 may represent, for example, a variety of communication interfaces, graphics interfaces, video interfaces, user input interfaces, peripheral interfaces or any combination thereof. As an example and not by way of limitation, an I/O device 142 may include a keyboard, keypad, microphone, monitor, mouse, printer, scanner, speaker, still camera, stylus, tablet, touch screen or touch panel, trackball, display adapter, video camera, another suitable I/O device or a combination of two or more of these. An I/O device 142 may include one or more sensors. This disclosure contemplates any suitable I/O devices 142 and any suitable I/O subsytems 140. Where appropriate, I/O subsystem 140 may include one or more devices or software drivers enabling processor subsystem 120 to drive one or more I/O devices 142. I/O subsystem 140 may include one or more I/O interfaces to interface to any one or more I/O devices 142, where appropriate. Although this disclosure describes and illustrates a particular I/O subsystem 140, this disclosure contemplates any suitable I/O subsystem.

Also shown in FIG. 1 is BIOS non-volatile random access memory (NV-RAM) 190, often simply or collectively referred to as the 'BIOS'. As shown, BIOS NV-RAM 190 may include BIOS firmware 192, representing pre-boot instructions executable by processor subsystem 120, for example, for preparing or initializing information handling system 100 to boot by performing a power-on self-test (POST) or activating various hardware components in preparation of launching operating system 132 for execution. In certain embodiments, BIOS NV-RAM 190 complies with a Unified Extensible Firmware Interface (UEFI) specification promulgated by the UEFI Forum (UEFI.org).

In one or more embodiments, when information handling system 100 is powered on or reset, firmware boot loaders may initialize the minimal set of hardware required for operation of the information handling system 100. The information handling system 100 may then be booted into a UEFI environment where BIOS firmware 192 continues initialization or the boot process of the information handling system 100. As referred to herein, BIOS firmware 192 may represent instructions executing on processor subsystem 120. It is noted that other processors or processor subsystems or both, such as an embedded controller (EC) or a secondary processor (not shown), may be used to execute BIOS firmware 192 in various embodiments. When BIOS firmware 192 executes, BIOS firmware 192 may be enabled to receive or determine a BIOS system boot policy or BIOS blacklist policy (element 250 of FIG. 2) for the information handling system 100 and to control execution of firmware file system (FFS) files based, at least in part, on that policy.

In one or more embodiments, a BIOS interface 194 may provide an interface to the BIOS firmware 192. BIOS interface 194 may be located in memory 130, BIOS NV_RAM 190, or any other suitable storage location of information handling system 100. In one or more embodiments BIOS interface 194 may be located external to or remote from the information handling system 100. For example, BIOS interface 194 may provide an interface for managing or populating one or more BIOS settings, for example, by a user or a system administrator. In operation, when information handling system 100 is powered on, BIOS firmware 192 may be launched and may execute. As referred to herein, BIOS firmware 192 may represent instructions executing on processor subsystem 120. It is noted that other processors or processor subsystems or both, such as an embedded controller (EC) or a secondary processor (not shown), may be used to execute BIOS firmware 192 in various embodiments.

Figure 2:
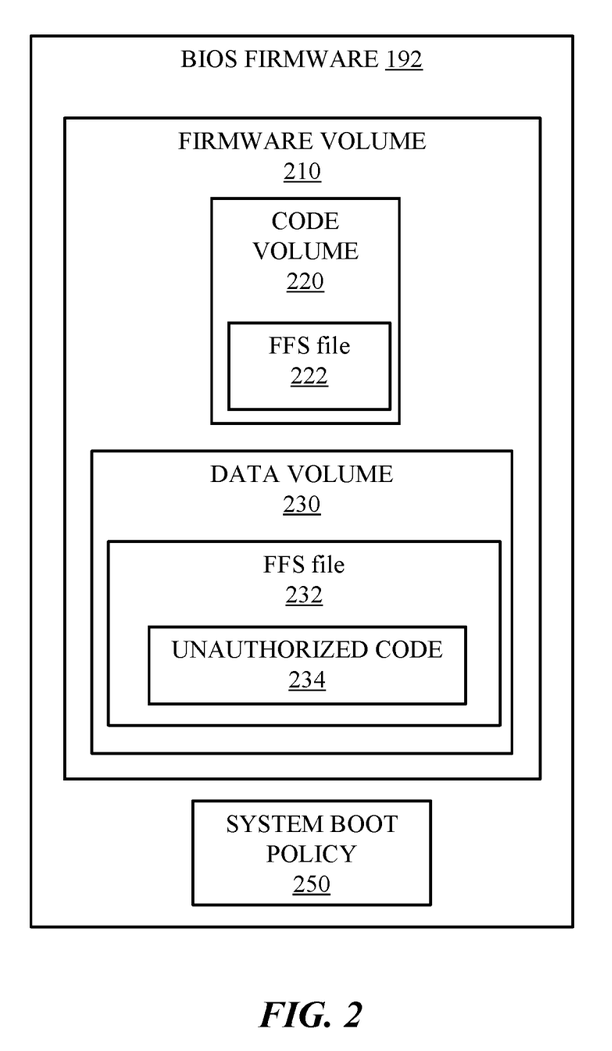
FIG. 2 is a block diagram of selected elements of an embodiment of an information handling system for a BIOS firmware for preventing execution of unauthorized files during initialization or a boot process according to one or more aspects of the present disclosure.

FIG. 2 is a block diagram of selected elements of an embodiment of an information handling system according to one or more aspects of the present disclosure, for example, preventing or blocking execution of an unauthorized file during initialization or a boot process. In one or more embodiments, BIOS firmware 192 is a UEFI compatible BIOS firmware. UEFI firmware treats all firmware space or regions as potentially including executable code and data. However, firmware 192 may be designed, constructed, or implemented to comprise one or more firmware volumes 210 where each firmware volume 210 may comprise or is divided in to two sections: one or more code volumes 220 and one or more data volumes 240. These two volumes are mapped on the UEFI file system as a firmware volume 210. A typical UEFI dispatcher treats all firmware volumes 210 as potentially including executable code and data. Additional functionality is added to the BIOS firmware 192 to maintain the separate volumes of a code volume 220 and a data volume 230 outside of the standard UEFI code. This added functionality of BIOS firmware 192 also prevents or blocks the unauthorized execution of code as the UEFI firmware would execute all code within any firmware volume 210 regardless of designation or association as a data volume or a code volume. For example, additional firmware volume mapping processes may be included in the UEFI dispatcher module or code to differentiate the firmware volumes 210 during execution of the BIOS firmware 192 as either a code volume 220 or a data volume 230.

The code volume 220 and the data volume 230 may comprise one or more FFS files 222 and 232, respectively, and may also include nested firmware volumes, or firmware volumes located within other firmware volumes. Firmware volume 210, including code volume 220 and data volume 230, contains or includes the firmware required to initialize the information handling system during initialization or a boot process, such as a power-on self-test (POST). One or more firmware volumes of firmware volume 210 may comprise executable code that is executed during the initialization of the information handling system 100, such as during a boot process, POST, reboot or any other system start-up process. For example, code volume 220 may comprise executable code that is executed during initialization of information handling system 100. One or more other firmware volumes of firmware volume 210 comprise data, such as non-volatile memory and data that may be altered by a user, administrator, operating system, or any other application, program, or interface of information handling system 100. For example, data volume 230 may comprise such data.

In one or more embodiments, the BIOS firmware 192 may be protected by one or more authentication or authorization technologies that provide signatures, keys, certifications, trusted platform measurement (TPM) techniques or any other security protection mechanism or combination thereof for one or more firmware volumes 210. One such technology is Intel Boot Guard, BIOS Guard, and Secure Boot by Intel®. In general, a code volume 220 is write-protected at runtime or during operation of the information handling system. For example, an application, module, operating system 132, or any other operation of the information handling system 100 is not permitted to write data, such as data in FFS file 222, to a code volume 220. Typically, a code volume 220 of a firmware volume 210 is updated only during a BIOS firmware update process after the specific firmware update has passed authorization or verification. As the code volume 220 is not protected from updates and writing, executable code in a FFS file 222 in code volume 220 is considered safe for execution.

In contrast, a data volume 230 typically comprises system configuration data and application data, for example, a custom boot logo. Any data, such as data in FFS file 232, may be updated at any time, including runtime. In one or more embodiments, data in FFS file 232, may be encrypted by the BIOS firmware 192 but not necessarily protected from any updating, editing, altering or writes. One or more UEFI variables may also be stored in the one or more data volumes 230. An application may write variables using UEFI runtime services or any other utility or service. A rogue or malware application or utility may place, write, inject or otherwise store unauthorized code 234, such as code that is malicious, suspicious or unsafe when executed, in one or more FFS files 232 of the data volumes 230. Storing the unauthorized code 234 in a FFS file 232 of a data volume 230 gives the unauthorized code 234 the appearance of being data, or rather, the unauthorized code 234 masquerades as data. Once the unauthorized code 234 is stored in a FFS file 232, the UEFI dispatcher or UEFI driver may copy the unauthorized code 234 into a memory, such as memory 130 or any other memory of information handling system 100. The unauthorized code 234 when executed from memory 130 may damage, alter or prevent proper operation of, install malware, adware, spyware or other unauthorized or unwanted applications on, or otherwise render inoperable or not usable for a desired or intended purpose the information handling system 100. Such unauthorized code 234 may be difficult to detect or even undetectable.

To prevent such unauthorized code 234 from being executed, the BIOS firmware 192 may comprise a system boot policy 250. The system boot policy 250 may comprise one or more settings, configurations, variables, instructions, guidelines or any other procedures or methods for handling, blocking or preventing execution of unauthorized code 234. The BIOS firmware 192 may implement the system boot policy 250 during any initialization of the information handling system 100. In one or more embodiments, the system boot policy 250 may require that certain FFS files 232 or 222 be deleted or not executed during a boot process or initialization of the information handling system 100. In one or more embodiments, the system boot policy 250 may be accessed via BIOS interface. In one or more embodiments, the system boot policy 250 may be password protected or otherwise prevented from be altered, edited or changed without one or more credentials or permissions.

Figure 3:
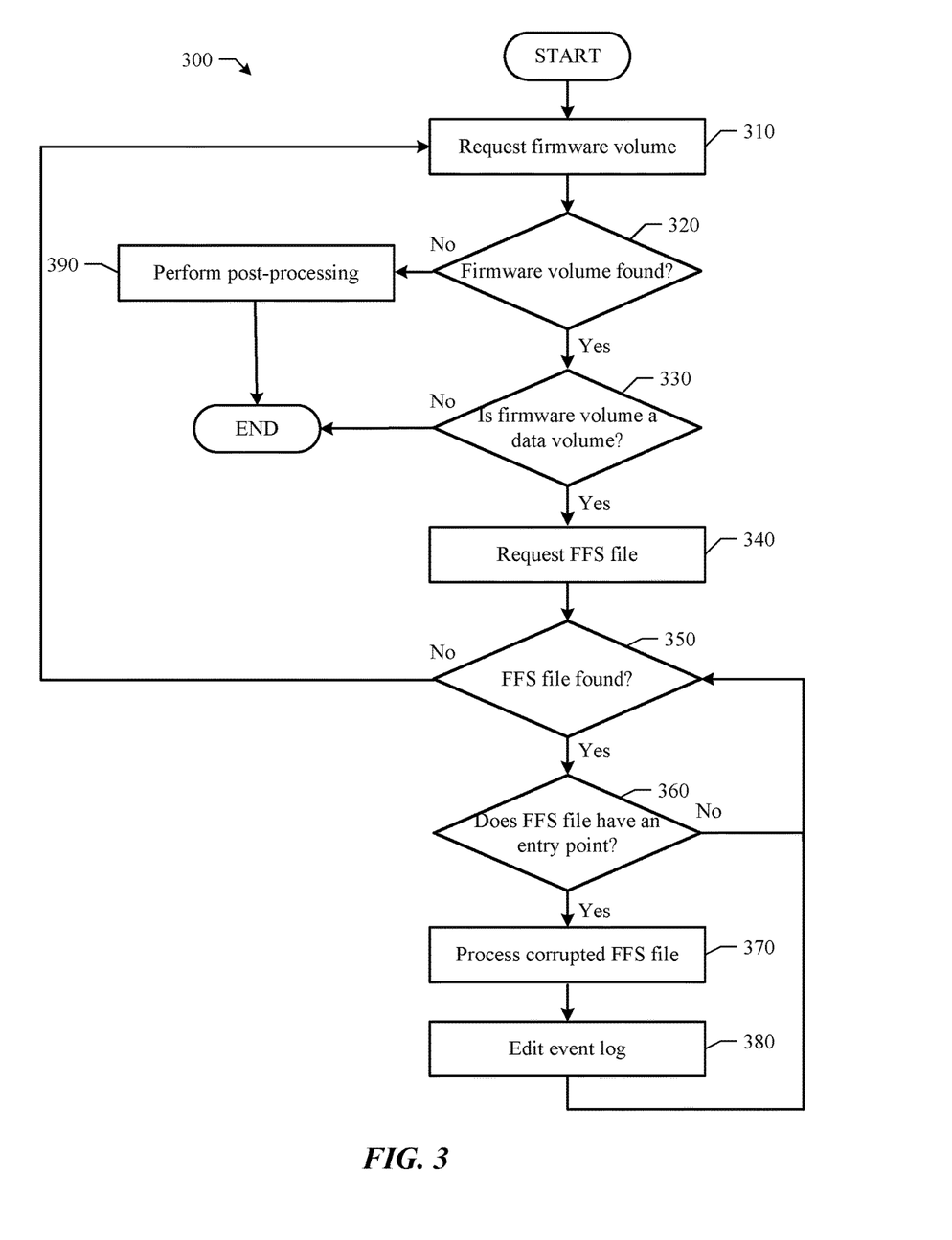
FIG. 3 is a flowchart depicting selected elements of an embodiment of a method for preventing execution of unauthorized firmware according to one or more aspects of the present disclosure.

Turning now to FIG. 3, a block diagram of selected elements of an embodiment of method 300 for preventing execution of unauthorized code according to aspects of the present disclosure is depicted in flowchart form. Method 300 may be performed by BIOS firmware 192 of information handling system 100 (see FIG. 1 and FIG. 2). It is noted that certain operations described in method 300 may be optional or may be rearranged in different embodiments. Method 300 generally depicts a method to include a firmware volume mapping process in the UEFI dispatcher to differentiate data from code in the firmware volumes 210.

Method 300 may begin by requesting a firmware volume 210 associated with BIOS firmware 192 at step 310. Generally, at the initial stages of initialization or a boot process, the UEFI framework dispatcher enumerates all the firmware volumes 210 associated with the BIOS firmware 192. At step 310, a list of firmware volumes 210 may be assembled or a fetch or get of each firmware volume 210 may be initiated. In one or more embodiments, a pointer or other indicator to a firmware volume 210 may be returned in response to the request at step 310. In one or more embodiments, a null value or empty set may be returned in response to the request at step 310 when all firmware volumes 210 have been traversed or the list of firmware volumes 210 has been completely parsed.

Figure 4:
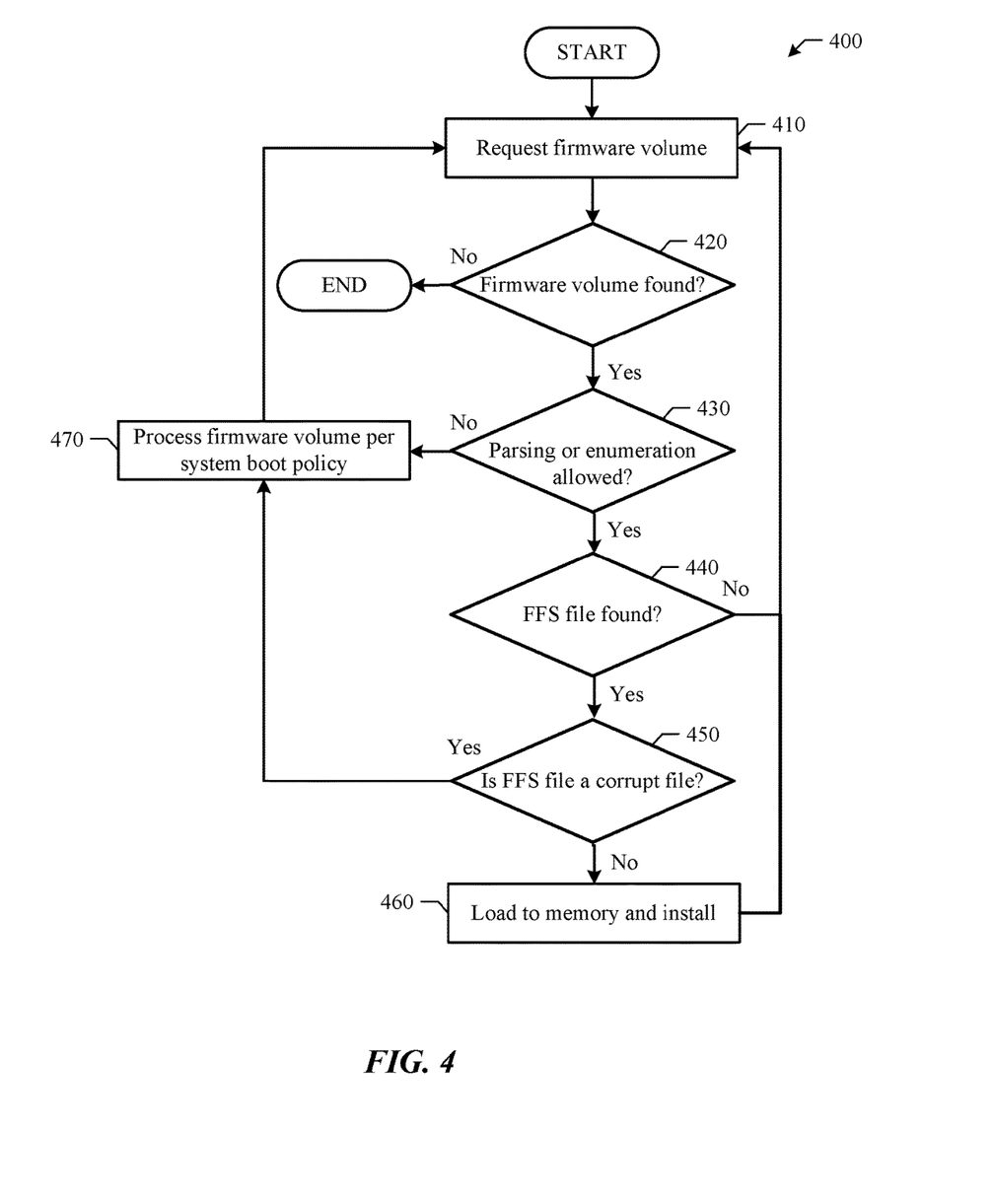
FIG. 4 is a flowchart depicting selected elements of an embodiment of a method for preventing execution of unauthorized firmware according to one or more aspects of the present disclosure.

At step 320, it is determined if a firmware volume 210 exists or if the list of enumerates firmware volumes 210 has been completely parsed or traversed. The method may end when the list has been completely parsed or may continue as illustrated in FIG. 4. If a firmware volume 210 is found or a pointer or other indicator to a firmware volume 210 is returned at step 320, at step 330 it is determined if the firmware volume 210 is a data volume 230. If it is determined at step 330 that the firmware volume 210 is a code volume 220, that no data volume 230 exists, or that all data volumes 230 have been completed traversed or a list of data volumes 230 has been completely parsed, the method may end or may continue as illustrated in FIG. 4.

Once it is determined that a firmware volume 210 is a data volume 230 at step 330, then at step 340 all FFS files 232 within the data volume 230 are requested or each of the FFS files 232 are traversed. At step 350 if a FFS file 232 is discovered or found, or the list of FFS files 232 has not been completed traversed, then the method continues to step 360. At step 360 it is determined if the FFS file 232 has an entry point or some other indicator that content of the FFS file 232 is indicative of executable code. If no entry point or executable code is found, the method continues at 350 until all FFS files 232 in all data volumes 230 have been traversed. Once all FFS files 232 have been traversed, the method continues at step 310.

If an entry point is found at step 360, then the unauthorized executable code in the file, the FFS file 232 with an entry point, is processed. As the FFS file 232 is stored within the data volume 230, any executable code found in the FFS file 232 is necessarily considered to be unauthorized executable code as the data volume 230 should only include data. In one or more embodiments, the FFS file 232 is processed based, at least in part, on the system boot policy 250. For example, the system boot policy 250 may require or specify that when executable code, such as an entry point, is found or discovered in the FFS file 232, then at step 370 the FFS file 232 determined to have an entry point or executable code (referred to hereafter as a corrupted FFS file) is processed. For example, the corrupted FFS file may be processed based, at least in part, on the system boot policy 250. The corrupted FFS file may be added to a list, table, array or any other entry, such as a blacklist. The blacklist indicates that the corrupted FFS file should not be executed during initialization or a boot process of the information handling system 100. In one or more embodiments, a unique identifier, such as a globally unique identifier (GUID), associated with the corrupted FFS files is added or stored in the blacklist to identify the corrupted FFS file. In one or more embodiments, the UEFI dispatcher may mark the corrupted FFS files. Based, at least in part on the system boot policy 250, the marking may indicate that the corrupted FFS file should be deleted, added to a blacklist, or any other indication that prevents the corrupted FFS file from being executed. In one or more embodiments, the data volume 230 or the firmware volume 210 associated with the corrupted FFS file or any combination thereof may be marked in a similar manner as discussed or known based, at least in part, on the system boot policy 250. For example, the marked corrupted FFS file and the corresponding data volume 230 may be deleted or blacklisted.

In one or more embodiments, the system boot policy 250 may also indicate that at step 380 a log is created, maintained, updated, displayed, stored, or any combination thereof of any event. The event may comprise adding a corrupted FFS file, a firmware volume 210 or a data volume 230 associated with the corrupted FFS file, or any combination thereof to a blacklist, marking any corrupted FFS file, firmware volume 210 or data volume 230 associated with the corrupted FFS file, or any combination thereof for deletion, or any other event related to determining that an FFS file 232 comprises an entry point or executable code. The log may be retrievable by a user, an administrator, an application, module, or by any other suitable mechanism or any combination thereof. The log may be used to determine infection or corruption rates for a given network, information handling system 100, or both. The log may be presented via a display or other user interface of the information handling system 100. The log may be presented as a spreadsheet, chart, graph, table, combined with other data or logs, or any combination thereof. The log may comprise one or more parameters that may identify the event, the corrupted FFS file, the data volume 230 or file volume 210 associated with the corrupted FFS file, a timestamp for the event, a BIOS version of the BIOS firmware 192, a timestamp or other identifier of the system boot policy 250, or any other suitable parameter or criteria.

After step 380, the method continues at step 350 until all FFS files 232 have been found or processed. Once all FFS files 232 have been found or traversed and processed, the method continues at step 310 until all firmware volumes 210 have been requested or traversed and processed. At step 320, when no other firmware volumes 210 are found the method proceeds to step 390. At step 390, the BIOS firmware 192 may perform post-processing of the corrupted FFS files based, at least in part, on the system boot policy 250. The post-processing may comprise deleting one or more FFS files 232, file volumes 210 and data volumes 230. For example, the system boot policy 250 may indicate that all corrupted FFS files marked, tagged or otherwise placed in a blacklist should be deleted or not executed. At step 390, these corrupted FFS files will then be deleted or not added to an execution list published to the UEFI dispatcher. The corrupted FFS files are blocked from execution as during initialization or a boot process, the UEFI dispatcher will only load to memory and execute those files published in the execution list.

In one or more embodiments, the implementation of the method illustrated at 300 may be based, at least in part, on the system boot policy 250. The system boot policy 250 may include one or more settings or criteria that indicate when the method illustrated at 300 should be implemented. For example, the system boot policy 250 may indicate that the method illustrated at 300 should be implemented for any one or more of initialization, boot process, reboot, power-on boot, POST, or any combination thereof.

Turning now to FIG. 4, a block diagram of selected elements of an embodiment of method 400 for preventing execution of unauthorized code according to aspects of the present disclosure is depicted in flowchart form. Method 400 may be performed by BIOS firmware 192 of information handling system 100 (see FIG. 1 and FIG. 2). It is noted that certain operations described in method 400 may be optional or may be rearranged in different embodiments. Method 400 generally depicts a method to include a firmware volume mapping process in the UEFI dispatcher to differentiate verified or authenticated from unauthorized FFS files 222 or 232.

The method 400 begins at step 410. The BIOS firmware 192 may request a firmware volume 210 or may enumerate firmware volumes 210 similar to the request at step 310 discussed above. At step 420 it is determined if a firmware volume 210 is found similar to the step 320 discussed above. When no other firmware volume 210 is found or the list of firmware volumes 210 has been completely traversed, the method ends. In one or more embodiments, a firmware volume 210 may be divided into a code volume 220 and a data volume 230. In one or more embodiments, step 410 includes a request for a firmware volume 210, a code volume 220, a data volume 230 or any combination thereof.

At step 430 it is determined if the firmware volume 210 is protected by a certificate, a key, a signature, TPM or any other security protection mechanism. For example, a firmware volume 210 may have an associated secure certificate digitally signed by trusted source. If the firmware volume 210 is not protected by a security protection mechanism or does not have a valid security protection mechanism, then the firmware volume 210 is processed at step 470 per the system boot policy 250. Such a firmware volume 210 is an unauthorized firmware volume. The system boot policy 250 may require that the BIOS firmware 192 mark or tag the unauthorized firmware volume. Any FFS files 222 or 232 included within a marked or tagged unauthorized firmware volume are excluded from inclusion in an execution list that is published to the UEFI dispatcher. The system boot policy 250 may also require that the BIOS firmware 192 delete the unauthorized firmware volume. In one or more embodiments, an event associated with an unauthorized file may be logged and handled similar to step 380 discussed above.

If at step 430, the firmware volume 210 parsing or enumeration is authorized the method continues at step 440. At step 440, it is determined if a FFS file 222 or 232 associated with the firmware volume 210 is found similar to step 350. If an FFS file 222 or 232 is not found, then the method proceeds to step 410 to request another firmware volume 210. If a FFS file 222 or 232 is found, the method proceeds to step 450 where it is determined if the FFS file 222 or 232 has been tagged or marked as a corrupted FFS file such that it is not to be executed during initialization or a boot process of the information handlings system 100. For example, the corrupted FFS file may be included in a list, table or array of files (as discussed above with respect to step 370) such as a blacklist. If it is determined that the FFS file 222 or 232 is a corrupted FFS file, then the method proceeds to step 470. If it is determined that the FFS file 222 or 232 is not a corrupted FFS file, then the FFS file 222 or 232 is added to an execution list published to the UEFI dispatcher for loading to memory and installing by the BIOS firmware 192.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (for example, one or more of blocks, modules, elements, components or processors) for performing one or more functions or operations. In one aspect, such an item may be an apparatus, hardware, or a portion thereof. In one example, an item may have a structure in the form of, for example, an instruction(s) encoded or stored on a machine-readable medium, on another device, or on a portion thereof. An instruction(s) may be software, an application(s), a subroutine(s), or a portion thereof. The instructions(s) may be for performing the function(s) or operation(s). The instruction(s) may be executable by one or more processors to perform the function(s) or operation(s). One or more processors may execute the instruction(s) by, for example, transferring or copying and instructions into an executable memory space and executing the instructions. In one example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (for example, a DSP, an ASIC, an FPGA, etc.), as a portion(s) of any of the foregoing, or as a combination(s) of any of the foregoing. Those skilled in the art will recognize how to implement the instructions, circuits, and processing systems.

In one aspect of the disclosure, when actions or functions (for example, hooking, modifying, intercepting, redirecting, determining, traversing, obtaining, creating, operating, deleting, removing, receiving, providing, generating, converting, displaying, notifying, accepting, selecting, controlling, transmitting, reporting, sending, or any other action or function) are described as being performed by an item (for example, one or more of blocks, modules, elements, components or processors), it is understood that such actions or functions may be performed, for example, by the item directly. In another example, when an item is described as performing an action, the item may be understood to perform the action indirectly, for example, by facilitating such an action (for example, assisting, allowing, enabling, causing, or providing for, such action to occur; or performing a portion of such an action). For example, determining can refer to facilitating determination, attaching can refer to facilitating attaching, and receiving can refer to facilitating receiving. In one aspect, performing an action may refer to performing a portion of the action (for example, performing a beginning part of the action, performing an end part of the action, or performing a middle portion of the action).

A reference to an element in the singular is not intended to mean "one and only one" unless specifically so stated, but rather "one or more." For example, a client may refer to one or more clients, a server may refer to one or more servers, an operation may refer to one or more operations, and a signal, message, or communication may refer to one or more signals, messages, or communications.

Unless specifically stated otherwise, the term "some" refers to one or more. Pronouns in the masculine (for example, his) include the feminine and neuter gender (for example, her and its) and vice versa. Headings and subheadings, if any, are used for convenience only and do not limit the invention.

A phrase such as an "embodiment" does not imply that such embodiment is essential to the subject technology or that such embodiment applies to all configurations of the subject technology. A disclosure relating to an embodiment may apply to all embodiments, or one or more embodiments.

An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

In one aspect, the term "coupled" or the like may refer to being directly coupled. In another aspect, the term "coupled" or the like may refer to being indirectly coupled or communicatively coupled.

Various items may be arranged differently (for example, arranged in a different order, or partitioned in a different way) all without departing from the scope of the subject technology. In one aspect of the disclosure, the elements recited in the accompanying claims may be performed by one or more modules or sub-modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for firmware volume mapping by a basic input/output system (BIOS) firmware of an information handling system to block execution of one or more unauthorized files during initialization of the information handling system, comprising:

receiving, by the BIOS firmware, an indicator to a firmware volume associated with the BIOS firmware;

determining by the BIOS firmware, whether the firmware volume is a data volume based, at least in part, on whether the firmware volume comprises data;

requesting by the BIOS firmware, one or more files within the data volume;

determining by the BIOS firmware, if the requested one or more files comprise an associated entry point, wherein the entry point is indicative of executable code;

tagging, by the BIOS firmware each of the requested one or more files determined to comprise the associated entry point as the one or more unauthorized files; and blocking, by the BIOS firmware, execution of each of the one or more unauthorized files during the initialization of the information handling system.

2. The method of claim 1, further comprising:
   marking for deletion the one or more unauthorized files.

3. The method of claim 1, further comprising:
adding to a list of blacklist files at least one of the one or more unauthorized files.

4. The method of claim 3, wherein adding to the list of blacklist files comprises adding a global unique identifier associated with the at least one of the one or more unauthorized files.

5. The method of claim 1, further comprising:
creating a log; and
adding to the log event information associated with each of the one or more unauthorized files, wherein the log event information comprises one or more parameters that identify an event and a BIOS version.

6. The method of claim 1, wherein the BIOS is unified extensible firmware interface (UEFI) compatible.

7. The method of claim 1, further comprising enumerating each firmware volume in a firmware of the information handling system.

8. An information handling system, comprising:
a memory;
a processor coupled to the memory, wherein the processor has access to a firmware basic input/output system (BIOS) to block execution of one or more unauthorized files during initialization of the information handling system, wherein the firmware BIOS includes one or more instructions stored in the memory and executable by the processor to:
receive an indicator to a firmware volume associated with the firmware BIOS;
determine whether the firmware volume is a data volume based, at least in part, on whether the firmware volume comprises data;
request one or more files within the data volume;
determine if the requested one or more files comprise an associated entry point;
tag as the one or unauthorized files each of the requested one or more files determined to comprise the associated entry point, wherein the entry point is indicative of executable code; and
block execution of each of the one or more unauthorized files during the initialization of the information handling system by the firmware BIOS.

9. The information handling system of claim 8, wherein the BIOS further comprises instructions to:
mark for deletion the one or more unauthorized files.

10. The information handling system of claim 8, wherein the BIOS further comprises instructions to:
add to a list of blacklist files at least one of the one or more unauthorized files.

11. The information handling system of claim 10, wherein adding to the list of blacklist files comprises adding a global unique identifier associated with the at least one of the one or more unauthorized files.

12. The information handling system of claim 8, wherein the BIOS further comprises instructions to:
create a log; and
add to the log event information associated with each of the one or more unauthorized files, wherein the log event information comprises one or more parameters that identify an event and a BIOS version.

13. The information handling system of claim 12, wherein the BIOS is unified extensible firmware interface (UEFI) compatible.

14. The information handling system of claim 11, wherein BIOS further comprises instructions to enumerate each firmware volume in a firmware of the information handling system.

15. A non-transitory computer-readable medium storing one or more instructions, the one or more instructions representing a basic input/output system (BIOS) of a BIOS firmware, that, when executed by a processor of an information handling system to block execution of one or more unauthorized files during initialization of the information handling system, cause the processor to:
receive an indicator to a firmware volume associated with the BIOS firmware;
determine whether the firmware volume is a data volume based, at least in part, on whether the firmware volume comprises data;
request one or more files within the data volume;
determine if the requested one or more files comprise an associated entry point, wherein the entry point is indicative of executable code;
tag as blocked for execution each of the requested one or more files determined to comprise the associated entry point as the one or more unauthorized files; and
block execution of each of the one or more unauthorized files during the initialization of the information handling system by the BIOS firmware.

16. The non-transitory computer-readable medium of claim 15, wherein the one or more instructions, that when executed by the processor or of the information handling system, further cause the processer to:
mark for deletion the one or more unauthorized files.

17. The non-transitory computer-readable medium of claim 15, wherein the one or more instructions, that when executed by the processor of the information handling system, further cause the processer to:
add to a list of blacklist files at least one of the one or more unauthorized files.

18. The non-transitory computer-readable medium of claim 17, wherein adding to the list of blacklist files comprises adding a global unique identifier associated with the at least one of the one or more unauthorized files.

19. The non-transitory computer-readable medium of claim 15, wherein the one or more instructions, that when executed by the processor of the information handling system, further cause the processor to:
create a log; and
add to the log event information associated with each of the one or more unauthorized files, wherein the log event information comprises one or more parameters that identify an event and a BIOS version.

20. The non-transitory computer-readable medium of claim 15, wherein the BIOS is unified extensible firmware interface (UEFI) compatible.

* * * * *